Figure 1:
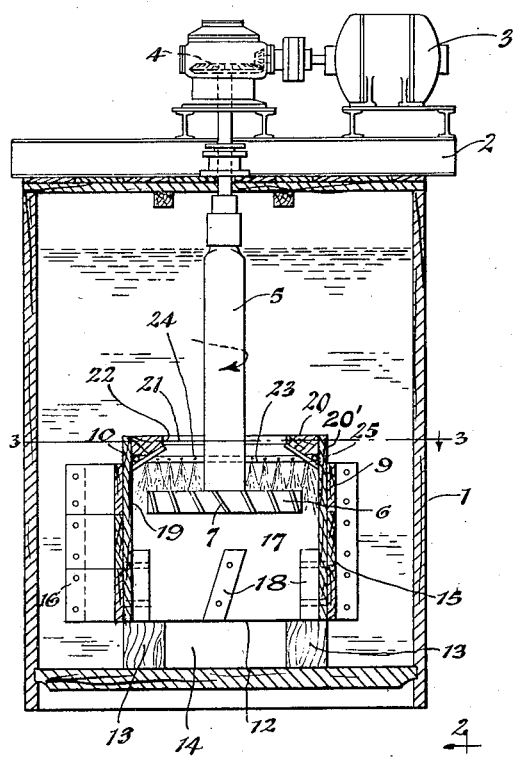

Nov. 14, 1933.    A. H. MUNRO    1,935,190

PROCESS AND APPARATUS FOR MIXING GASES WITH LIQUIDS

Filed July 30, 1931

Inventor
Albert H. Munro
by

Patented Nov. 14, 1933

1,935,190

UNITED STATES PATENT OFFICE 1,935,190

PROCESS AND APPARATUS FOR MIXING GASES WITH LIQUIDS

Albert H. Munro, Buffalo, N. Y., assignor to National Aniline and Chemical Company, Incorporated, New York, N. Y., a corporation of New York Application July 30, 1931. Serial No. 554,065

12 Claims. (Cl. 261—93)

This invention relates to a process and apparatus for commingling gases and liquids, and relates particularly to a process and apparatus for phosgenating solutions or suspensions of amino compounds in a liquid vehicle.

In chemical processes wherein a gas is introduced into a liquid for reaction with a component dispersed, suspended or dissolved in the liquid, difficulty is frequently experienced by reason of the failure of the gas to be absorbed and to react with sufficient rapidity. Where side reactions are possible this difficulty frequently results in the formation of a great deal of by-product and consequent waste of gas.

The present invention has for one of its objects the provision of a process and apparatus for commingling gases and liquids in intimate contact, whereby the rate of absorption of the gas in the liquid is increased. A further object is a reduction or elimination of loss of gas which is caused by failure of the gas to be absorbed in the liquid. A further object is the promotion of chemical reactions between a gas and a component of a liquid by producing a more intimate contact between the gas and the reactive component. A further object is a diminution or elimination of the hazard of reacting poisonous gases with liquids. Other objects of the invention are the promotion of a preferential reaction of phosgene on an organic amino compound in the presence of inorganic alkaline materials, a more complete utilization of raw materials, and a shortening of the time cycle of operation. These and other objects will be apparent from a consideration of the following disclosure taken in connection with the accompanying drawing.

According to the present invention, a gas is introduced into a downwardly moving stream of liquid, then into an agitated zone where it is agitated and commingled with the liquid, then downward again to permit complete absorption of the gas in the liquid. The liquid then may be recirculated for further treatment with the gas as hereinbefore described.

The invention accordingly comprises the several steps and the relation of one or more of such steps with respect to others thereof, and the apparatus embodying features of construction, combination of elements and arrangement of parts which are adapted to effect such steps which will all be exemplified in the following detailed disclosure and illustrated in one of its embodiments in the accompanying drawing. The scope of the invention will be indicated in the claims.

In the practice of the present invention downward movement of the liquid may be solely relied on to carry the gas into the agitated zone, or the gas may be introduced with a downward velocity to assist its introduction into the agitated zone. The velocity of movement downward of the liquid is preferably sufficient to overcome the tendency of the gas to rise upward through the liquid. In a preferred embodiment of the invention, upward movement of the gas through the liquid is obstructed by a baffle or plurality of baffles which hold the gas in contact with the downwardly moving stream of liquid.

Figure 2:
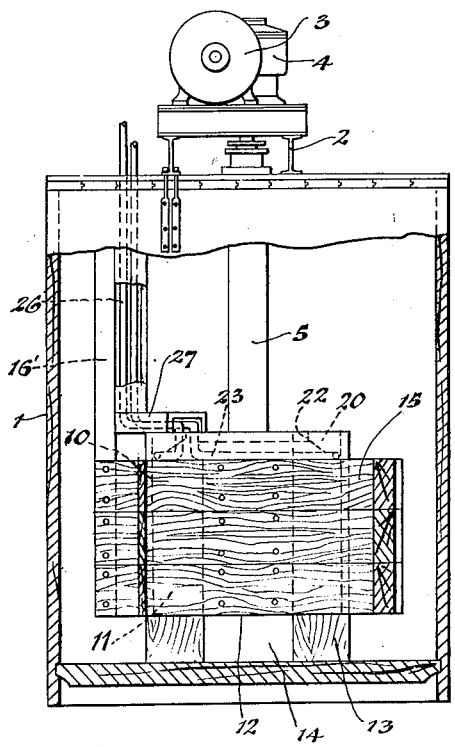
Figure 3:
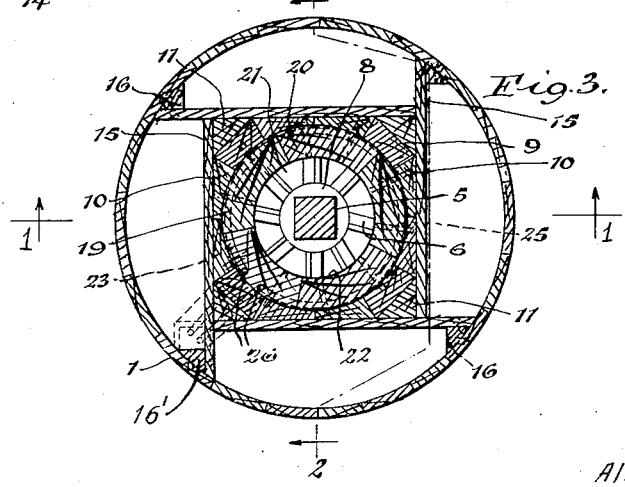

The invention will be further described in connection with the accompanying drawing which exemplifies a preferred form of apparatus embodying the principle thereof. Figure 1 of the drawing is a sectional view taken on the line 1—1 of Figure 3, Figure 2 is a section at right angles to Figure 1 taken on line 2—2 of Figure 3, and Figure 3 is a horizontal section on line 3—3 of Figure 1.

Referring to the drawing, the numeral 1 indicates a vat constructed of wood or other suitable corrosion resisting material. The cross beams 2 on top of the vat 1 support a motor 3 and reduction gearing 4 for transferring power therefrom to a vertical agitator shaft 5. The agitator shaft extends downward into the vat 1, and as shown, is coupled to a metal drive shaft, the coupling being covered with hard rubber or other corrosion resisting material. On the lower end of the agitator shaft 5 is mounted an agitator 6 of the impeller or propeller type. It is shown as an impeller agitator comprising a series of radial blades 7 inclined to the vertical and extending from a central hub 8 secured to the shaft 5.

Within the lower portion of the vat 1 is secured a draft tube 9 of suitable corrosion resisting material which may be constructed in any suitable manner. As shown, the draft tube 9 comprises a series of wooden segments 10 built up about the triangular corner posts 11 to form a rectangular block or tube having a vertical opening 17 of circular cross section passing therethrough. The triangular corner posts 11 have portion 13 which extends downwardly below the body of the tube 9 and rest on the bottom of the vat to support the lower end 12 of the tube in spaced relation to the bottom of the vat, thereby providing spaces 14 between the bottom of the vat and the lower end 12 of the tube for passage of liquid therethrough. The tube 9 is held in place in the vat by the braces 15 which are dowelled to the vertical sector shaped posts 16, which in turn are dowelled to the vat 1. The opening 17 in the tube 9 is of somewhat larger diameter than the impeller 6, and the draft tube is arranged in the vat so that the impeller 6 rotates in the circular opening 17 near its upper end. Vertically inclined baffles 18 secured to the inner wall 19 of the tube and located below the impeller 6 resist the tendency of the impeller 6 to rotate the liquid in the tube. The baffles 18 are shown as four in number, but any desired number may be used; they may be omitted, if desired, although they are preferably employed.

The inlet of the draft tube 9 is restricted by a baffle or lip 20 which overhangs the outer edge of the impeller 6, and is secured to the wall 19 of the draft tube above the impeller. As shown, the baffle 20 is annular in form and extends inwardly from the wall 19 of the draft tube for a distance of about half the radius of the opening 17, thereby forming an annular opening or inlet 21 between the shaft 5 and inner edge 22 of the baffle 20 through which liquid is drawn into the draft tube 9 by the impeller 6. A pipe coil 23 of any suitable corrosion resisting material, as for example ebonite, is located at the restricted inlet 21 or between the baffle 20 and the impeller 6, preferably within the zone included by the angle 20' formed by the baffle 20 and the inner side wall 19 of the draft tube. The coil 23 is perforated at 24 to permit the discharge of gas from the coil into the liquid in the draft tube 9. The coil 23 may be held in place in any suitable manner and is shown as secured by a series of dowels 25 which are driven at an angle into the walls of the draft tube 9, and wedge the coil against the overhanging baffle 20. If desired, a portion of the under edge of the baffle 20 may be beveled to provide a bearing surface for the outer ends of the dowels 25. The gas is supplied to the coil 23 through the lead-in pipes 26 which are braced by a box or housing 27 secured to the tube 9 and to the adjacent extension 16' of one of the sector shaped posts 16.

The invention will be described in connection with the phosgenation of 6.8-naphthalene-disulfonic-acid-azo-phenyl-azo-2-methyl-4-amino-5-methoxybenzene, but it will be understood that the invention is not limited thereto, but may be employed in connection with any process in which a gas is commingled with a liquid. It is of especial advantage however in the phosgenation of dyestuff intermediates having a primary amino group for the production of dyestuffs inasmuch as it enables more complete reaction to be obtained.

In operation, the vat 1 is filled to the level shown by the dotted line in Figure 1 with a solution of 24 parts of the sodium salt of 6.8-naphthalene-disulfonic-acid-azo-phenyl-azo-2-methyl-4-amino-5-methoxybenzene in 700 parts water made slightly alkaline to brilliant yellow test paper by the addition of soda ash thereto. The impeller 6 is rotated by motor 3 and the reduction gearing 4 which drives the agitator shaft 5 at such speed that there is practically no vortex set up in the body of liquid. The rotation of the blades of the impeller 6 produces a suction in the draft tube 9 above the impeller 6 which draws the solution downward through the opening 21 into the agitated zone in draft tube 9 where it is thoroughly churned by the impeller. The solution then passes by the rotation of the impeller downward through the lower part of the opening 17 to the bottom edge 12 and is discharged into the vat through the opening 14 between the bottom of the vat and the lower end 12 of the tube 9. The solution in the vat is then circulated upward and is again drawn into the passage 17 through the opening 21, thus providing a continuous circulation of the liquid. Phosgene is introduced into the pipe coil 23 through the lead-in pipes 26 and is discharged into the upper part of the draft tube through the series of openings 24 in the pipe coil 23.

The solution is drawn into the passage 17 through the opening 21 at such velocity that it carries with it any bubbles of phosgene which may form in the passage 17 and tend to rise unabsorbed through the solution. Further, the overhanging baffle 20 obstructs the upward passage of the phosgene and directs it into the downwardly moving stream of liquid in passage 21, which carries the phosgene into the agitated zone about the impeller 6. In the agitated zone the solution and phosgene are intimately commingled causing a rapid absorption of phosgene by the solution, and a preferential reaction of the phosgene with the 6.8-naphthalene-disulfonic-acid-azo-phenyl-azo-2-methyl-4-amino-5-methoxybenzene, with liberation of hydrochloric acid. Little or practically none of the phosgene reacts with the soda ash, which is present to bind the hydrochloric acid produced. Throughout the reaction, the solution is maintained alkaline to brilliant yellow test paper by the addition of soda ash. Whatever phosgene is not absorbed in the zone above the agitator is carried downwardly by the solution into the lower portion of the draft tube 9 and out the horizontal passage 14 into the vat. During its whole course of travel, the phosgene is maintained in intimate contact with the solution and is practically completely absorbed therein. The agitation is sufficient to prevent the formation of any large quiescent pockets inside or outside of the draft tube and prevents the adherence of a stationary film of liquid to the walls of the vat. For the best operation the level of the liquid in the vat 1 should be sufficiently above the agitator 6 so that there is no extensive vortex formed in the liquid.

It is to be understood that the invention is not limited to the above description, and that various changes may be made in the details of the process and the construction, combination of elements and relation of the parts of the apparatus, as will be evident to one skilled in the art. The braces 15, as shown, divide the vat exterior of the draft tube 9 into a series of segment-shaped portions which communicate with each other at the bottom and at the top, a construction which assists in preventing lateral motion of the liquid in the vat. However, the tube 9 may be supported by other suitable means. Also, while the tube 9 is shown in the preferred modification as a block having a circular opening therein, the invention is not limited to the exact shape shown, and accordingly the tube may be cylindrical in shape with an angular opening therein, or may have any other desired form. Furthermore, although the inlet of the draft tube 9 is shown as restricted by an annular baffle, any other suitable restricting means may be employed, or the inlet of the draft tube may be formed with any suitable type of restricting lip.

Since changes in the carrying out of the above process and in the construction, combination and arrangement of the parts set forth may be made without departing from the scope of the invention, it is intended that all matter contained in the above description or shown in the accompanying drawing shall be interpreted as illustrative and not in a limiting sense, except as limited by the claims.

I claim:

1. A process for treating liquids with gases which comprises introducing a gas into a downwardly moving stream of liquid below the surface level of the liquid, said stream of liquid having a sufficient velocity to overcome the tendency of the gas to rise therethrough, churning said liquid in its downward course to commingle the gas and liquid, then continuing the downward movement of the mixed gas and liquid to further the absorption of the gas, and recirculating the liquid for further treatment with gas.

2. A process for treating liquids with gases which comprises introducing a gas into a downwardly moving stream of liquid having a sufficient velocity to overcome the tendency of the gas to rise therethrough, then churning said liquid in its downward course to commingle the gas and liquid, then continuing the downward movement of the mixed gas and liquid to complete the absorption of the gas, separating the stream of liquid into a plurality of separate streams and recirculating the liquid for further treatment with gas.

3. A process for treating liquids with gases which comprises introducing a gas in a plurality of fine streams into a downwardly moving stream of liquid below the surface level of the liquid, said stream of liquid having a sufficient velocity to overcome the tendency of the gas to rise therethrough, baffling the gas to resist its tendency to rise through the liquid, then agitating the resulting downwardly moving mixture of gas and liquid to produce intimate commingling thereof, then continuing the downward movement of the mixed gas and liquid to further the absorption of the gas, and recirculating the liquid for further treatment with gas.

4. An apparatus of the character described comprising a container for liquid, a draft tube, a restricted passageway communicating the draft tube with said container, means for propelling liquid downwardly through the draft tube and agitating the liquid within a zone of the draft tube, and means for introducing gas into the draft tube between the agitated zone and the restricted passageway.

5. An apparatus of the character described comprising a container for liquid, a draft tube, a restricted passageway communicating the draft tube with said container, means for propelling liquid downwardly through the draft tube, means for agitating the liquid in a zone of the draft tube, and means for introducing a gas into the draft tube between the agitated zone and the restricted passageway.

6. An apparatus of the character described comprising a container for liquid, a draft tube within the container having a restricted inlet communicating with said container, whereby liquid is circulated in said container and through said draft tube, means for propelling liquid downwardly through the draft tube and agitating the liquid within the draft tube, and means for introducing gas into the draft tube beneath the restricted inlet.

7. An apparatus of the character described comprising a container for liquid, a draft tube within the container having a restricted inlet, means for propelling liquid downwardly through the draft tube and agitating the liquid within the draft tube, and means for introducing gas into the draft tube beneath the restricted inlet.

8. An apparatus of the character described comprising a container for liquid, a draft tube within the container, a baffle restricting the inlet of the draft tube and forming an angle with the inner side wall of the draft tube, means for propelling liquid downwardly through the draft tube and agitating the liquid within the draft tube, and means for introducing a gas into the draft tube within the zone included by said angle.

9. An apparatus of the character described comprising a container for liquid, a draft tube within the container having a restricted inlet, an agitator within the draft tube for propelling the liquid downwardly therethrough and imparting a whirling motion to the liquid in the draft tube, baffles below the agitator for resisting the whirling motion of the liquid in the draft tube, and means for introducing a gas into the draft tube.

10. An apparatus of the character described comprising a container for liquid, a draft tube within the container spaced from the bottom thereof and having a restricted inlet, means for propelling liquid downwardly through the draft tube and agitating the liquid within the draft tube, means for introducing gas into the draft tube at the restricted inlet, and vertical partitions spaced from the bottom of the container to divide the container into compartments communicating at their bottoms with the interior of the draft tube.

11. An apparatus of the character described comprising a container for liquid, a draft tube within the container spaced from the bottom thereof, a baffle restricting the inlet of the draft tube, an impeller agitator within the draft tube for propelling liquid downwardly through the draft tube and agitating the liquid within the tube, and means for introducing gas into the draft tube between the agitator and the restricted inlet.

12. An apparatus of the character described comprising a container for liquid, a draft tube within the container spaced from the bottom and side walls thereof, an impeller agitator operatively mounted within the draft tube intermediate the ends thereof for moving liquid downward through the draft tube and agitating liquid in the draft tube, a baffle restricting the inlet of the draft tube and forming an angle with the inner side wall of the draft tube, a plurality of gas inlets in the draft tube for introducing gas into the portion of the zone included by said angle above said agitator, and a plurality of baffles on the inner wall of the draft tube below the agitator for impeding a rotary motion of the liquid within the lower portion of the draft tube.

ALBERT H. MUNRO.